Nov. 3, 1936.   J. A. LOGAN ET AL   2,059,374
OIL TESTER
Filed March 30, 1934
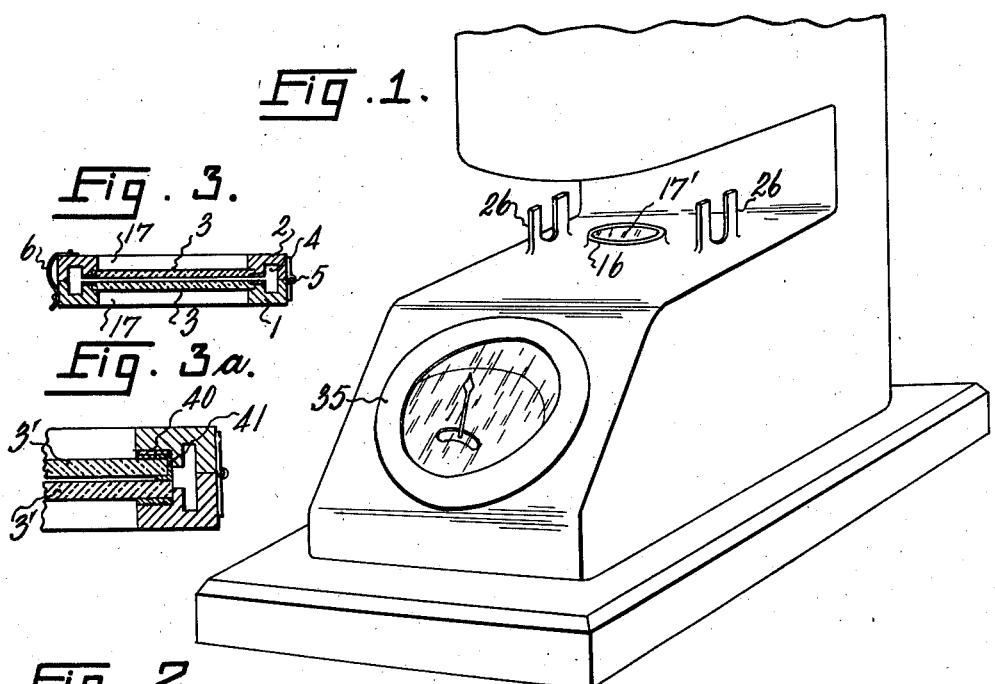
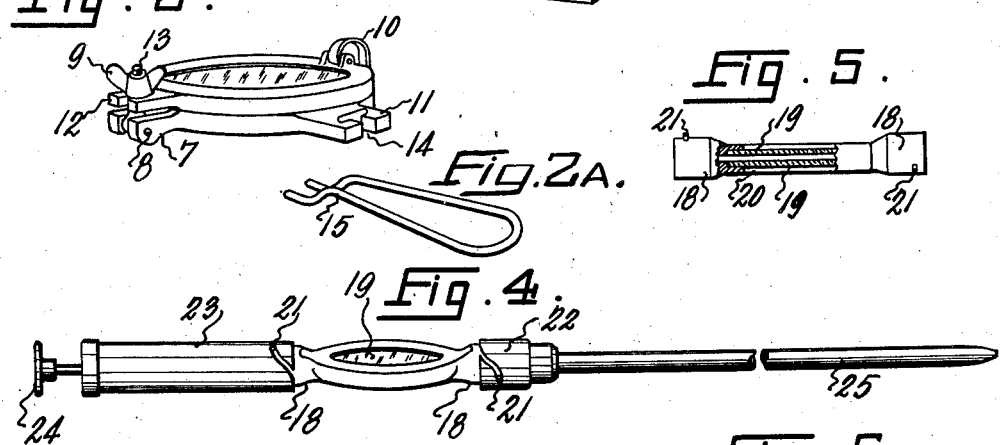
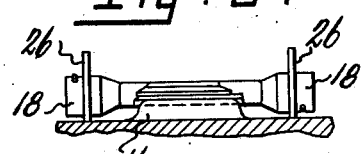
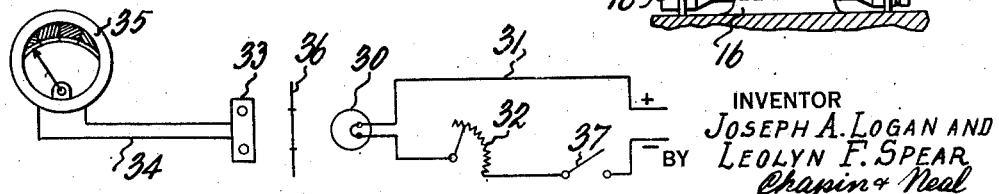
INVENTOR
JOSEPH A. LOGAN AND
BY LEOLYN F. SPEAR
Chapin & Neal
ATTORNEYS Patented Nov. 3, 1936

2,059,374

UNITED STATES PATENT OFFICE 2,059,374

OIL TESTER

Joseph A. Logan, Springfield, and Leolyn F. Spear, Westfield, Mass., assignors to Gilbert & Barker Manufacturing Company, West Springfield, Mass., a corporation of Massachusetts Application March 30, 1934, Serial No. 718,218

4 Claims. (Cl. 88—14)

This invention relates to an improvement in means for testing liquids. It particularly relates to an improved tool or device for holding the liquid sample to be tested. Such tool is planned for use with a testing machine and in one aspect the invention resides in a combination of such tool and cooperating part of the testing machines.

The kind of a testing machine to which the invention particularly relates is one using the so-called "electric eye" to measure variations of light passing through different test samples. The tested characteristic of a sample is derived from its variation from a standard with respect to the amount of light passed through the sample. Such a testing machine is shown generally by patent to Ybarrondo, No. 1,556,766 of October 13, 1925. There are many other examples of the same kind of measuring instruments in the prior art.

The way in which our improvements are constructed and used will be understood from the accompanying drawing and description.

Fig. 1 is a view of a sufficient part of a testing machine casing to illustrate its use in practicing the invention in its preferred form;

Fig. 2 is a perspective view of one form of tool for holding a liquid sample and and a handle for the tool;

Fig. 2a is a detail view of the handle;

Fig. 3 is a sectional view of a simpler form;

Fig. 3a is a detail view of a modification that will be referred to;

Fig. 4 is a side view of a more fully developed tool form for use with the testing machine of Fig. 1;

Fig. 5 is a detail view partly in cross-section of the sample holding part of Fig. 4;

Fig. 6 is a detail view with parts broken away to show the manner in which a part of the tool of Fig. 4 cooperates with a part of the instrument of Fig. 1; and Fig. 7 is a diagram to show a suitable arrangement of testing machine parts in a conventional manner.

The apparatus shown is primarily designed for testing the amount of dirt in engine oil. Of course it is capable of all sorts of other specific applications in testing liquids for industrial purposes. But the description will refer to the primary use.

The tools shown in Figs. 2 and 3 are much alike. Referring to Fig. 3, that one comprises two annular frames 1 and 2, each carrying a circular window 3 of glass. A hinge 5 holds the frames together for opening and closing. A spring snap lock 6 will hold the frames together. When together the windows 3 are parallel and spaced a very short distance apart. The very narrow space between such windows communicates all around the window circumference with the annular space 4 which is in the nature of an overflow reservoir having space extending transversely above and below the horizontal and narrow space between the windows. The meeting line on the outer circumference of the window frames is preferably located at least as far above the central plane as the inner face of the top window 3, as indicated.

The tool of Fig. 3 is a sample or test specimen holder for a liquid to be tested. Assuming one is to test the amount of dirt in the oil of an automobile crank case, a small specimen of such oil is taken out and, with frame 2 turned back on its hinge, the oil is dropped on the bottom window 3. The top window is then turned down with frame 2 and the parts temporarily locked in the position of Fig. 3. In this position an oil specimen of even thickness can be seen between the two glass windows 3.

It is important to have the film of uniform thickness as a variation will affect the amount of light that can pass through the film. The construction of Fig. 3 will require a good deal of accurate fitting to make the film space uniform between the window glasses. To avoid this the glasses 3 are preferably fitted into the frame as indicated in Fig. 3a. In this figure the shoulder in the frame to take the glass is provided with a cork washer (or compressible packing) 40. A narrow U-shaped clip 41 is slipped over the edge of the top glass 3'. And another similar clip is put on the top glass at a diametrically opposite position to the one shown. Two similar clips (not shown) are put on the bottom glass 3' at diametrically opposite points. The line between the clips on one glass is arranged at right angles to the line between the clips on the other glass. With this arrangement the inner foot of each clip is located between the two glass windows and it acts as a spacer for the glasses. There are four such spacers positioned 90° apart so that the glasses will be held separated without tipping if the spacers or clips 41 are of uniform thickness in their material and the inner faces of the glass have uniform surfaces. With this arrangement the glasses in spaced relation can be held tightly together by the window frames. The foot of each clip can readily embed itself in the adjacent cork washer 40. The clips are easily made of flat metal stock of exactly the same metal thickness. The assembly of the glasses in the frames is preferably by a slip fit against the shoulders indicated. They can be readily inserted and removed.

The advantage of this arrangement is that the window frame construction does not need to be made with great accuracy for the nice double window spacing to give the film thickness. Nor do the two glass windows need to be of the same thickness to get the film spacing desired. The window frames and glass windows can be made with usual manufacturing tolerances. But with the construction disclosed in connection with Fig. 3a the film space between the windows will be exactly determined by the thickness of the four spacers or clips 4I. It is quite easy to make the clip thickness exactly what is wanted for the film thickness between the windows. Furthermore, it is easy to take the glasses out of the frames when soiled with use and put clean ones in that will give the same film thickness.

The window glasses in the other forms of tools referred to are preferably held in place by the same arrangement as just described. To simplify the drawing this window mounting detail is not shown in all the tools disclosed.

With the tool of Fig. 3 in horizontal position one has a specimen film of the oil to be tested and one of uniform thickness. In getting the test film of oil preparatory to testing, it has not been necessary to exactly gauge the quantity of oil placed between the windows. The actual film is preferably a very small quantity and all excess over the film quantity wanted is squeezed out (as the frame parts are closed) into the reservoir space 4. The oil is squeezed into film form by the angular approach of the windows and that acts to eliminate air bubbles. Thus, all that is necessary as a practical manipulation is to place on lower glass window 3 that quantity of oil to be tested that does not exceed the capacity of the film space and the overflow reservoir 4. The actual test film located between the windows is such a small amount that the leeway provided for the operator to get enough and not too much, is sufficient to avoid any trouble in taking the specimen or any bother in manipulating the tool.

The tool of Fig. 2 is substantially like that of Fig. 3, except in a few particulars. The frame members are provided with lugs 7 and 12 for a more powerful lock and closing means. Bolt 13 pivoted at 8 is provided with wing nut 9 to force the windows into parallel position in finally closing the frames. This is of advantage when heavy oil needs to be squeezed into film form between the windows or when the tool needs to be more forcibly closed. The frames are provided with a hinge arm 10. A lug 11 is provided on the bottom frame with the slot opening 14 indicated, by which a spring wire handle 15 can be easily and removably attached to the tool. This is done by squeezing the handle together, inserting it through the slot and letting it spring apart with its ends under the lug and its bends extending upwardly and over the lug, one bend adjacent each side at the slotted entrance.

When the test film of oil is prepared by the use of either tool and container, it is then placed on the centralizing boss 16 of the testing instrument. Referring to Fig. 3, the inner circumference 17 of the frame parts 1 and 2, which give the unobstructed openings for looking through windows 3, is a circumference preferably made to fit snugly and exactly over the circumference of boss 16 and to bring the lower window 3 into flat position resting on the flat rim part of boss 16. This is true of all the tools shown in Figs. 2, 3, and 4. Boss 16 has a window opening 17' centrally of the boss. The placing of the film holding tool on boss 16 places the film centralized over the opening 17' in the testing instrument. The manner of testing will be referred to later.

Having in mind the particular plan of testing automobile engine oil by taking a test sample from the crank case, the special tool shown in Figs. 4, 5, and 6 has been developed for most conveniently handling such a sample. A window frame arrangement is made up as shown generally in Fig. 5. It is circular with bosses 18 extending out from opposite ends. It has two glass windows 19 with openings 20 of the circumference to fit boss 16 of the testing instrument. The spacing of the windows is of film thickness and the film space has communication with openings extending longitudinally through end bosses 18.

The tube 25, preferably made flexible, with sleeve 22 is removably attached by a bayonet joint slot to one boss 18 by its stationary pin 21. A suction hand pump 23 with handle 24 is in the same manner removably attached to the opposite boss 18.

With this tool, tube 25 can be inserted in any convenient automobile engine opening where a sample of oil can be sucked out. And it is of considerable advantage to have a tool to take the test sample from the bottom of the crank case where the oil is most likely to have most dirt in it, and to form the film by the tool drawing up from this point. When the end of the tube gets down into the oil, handle 24 is drawn back and the pump 23 sucks out the sample through the tube and through the film space between glass windows 19 and into pump 23. All that is necessary in manipulation to get the sample in film form between the windows is to pull handle 24 until the film space in view of the operator is seen to be full and then stop.

Of course this tool of Fig. 4 is an extremely convenient tool for merely taking an oil sample from an automobile crank case for testing its condition by the human eye and judgment alone. It can be contrasted with the customary method of inserting a bare rod into the crank case and looking at the oil film upon taking out the rod. The new tool is a great improvement on the old stick method. But the tool is also especially adapted for most conveniently getting successive test specimens in mathematical predetermined film form for the "electric eye" testing machine.

For this purpose the pump 23 and tube 25 are removable, as shown. The central portion is then in most convenient form to place on the testing instrument of Fig. 1. But of course the tool of Fig. 4 could be put in the testing instrument without separating the parts, if one desired. The end bosses 18 are received into U-shaped holders 26 and the bottom window frame fits on boss 16, as indicated in Fig. 6, in which figure parts are broken away to indicate the accurate relationship of the film position on the boss and over its opening 17.

When the tools described are frequently used, as they are planned to be at gasoline filling stations, for rapidly testing the oil for one customer after another, the problem of easy and quick cleaning between tests arises. The tools of Figs. 2 and 3 are cleaned by opening the window frames and washing the inside surfaces of the windows contaminated by dirty oil. Or the windows can be removed from the frames for cleaning and spare windows put in for continued use, as described in connection with Fig. 3a.

The tool of Fig. 4 has the advantage that it can be cleaned by the pump and tube 25 cooperating to reciprocate a cleaning fluid through the film space between the windows. In addition, the tool of Fig. 3 can be used as the central part of the tool of Fig. 4. With such a change in the construction of Fig. 4 one could clean the test film windows either by opening the window casings or by removing them and using spare windows, or by the pumping of cleaning fluid without opening the casings. The pumping method is quickest and most convenient. It would do for most of the work. But when a more thorough cleaning is desirable the window frames could be opened for the purpose.

Except in the features indicated in the claims, the particulars of the testing machine per se are not part of the invention. Many different types of known machines could be used in connection with the invention. A brief description of the test intended may help to understand the full scope of the kind of work that can be done with the tools described.

Referring to Fig. 7, this illustrates a photoelectric cell means for measuring light generally like that shown in said prior Ybarrondo patent. A lamp 30 in a supply circuit 31 gives a light source of predetermined intensity. This light can be adjusted to the desired intensity by rheostat 32. A photo-electric cell 33 is spaced in line with lamp 30. The light from the lamp which reaches electric cell 33 determines the amount of current in circuit 34. A micro-ammeter 35 in that circuit measures the current. The line 36 indicates the position of a film (of anything). The amount of light from lamp 30 passing through the film on line 36 and reaching cell 33 is what instrument 35 measures, by measuring the current in circuit 34. Such current differs from what the current is in that circuit when the light does not need to pass through the film to be tested. This general measuring arrangement is illustrative of one of many specific types that could be used and they are very well known in the measuring and testing arts. It is such an arrangement that we prefer to use in testing the films prepared and held by our improved tools.

Assuming that oil is to be tested for the amount of dirt in it: the instrument 35 would be calibrated to give direct readings to indicate, for example, "good", "fair", "poor", and "bad" condition for a film at 36 according to its dirt content. The indications can of course be by words, figures, colors, or any combination of desired indications.

The testing instrument diagrammatically illustrated in Fig. 7 is conveniently housed as shown in Fig. 1.

The preferred use of the improved tools will now be described with relation to the testing instrument of Fig. 1.

The tool of Fig. 3 is the simplest. In clean form it is used to prepare and hold a film, as already stated. It is placed on boss 16, switch 37 (Fig. 7) closed, and indicator 35 gives a direct reading of the condition of the film test specimen, in our case the dirt condition of the oil. The instrument of Fig. 2 can be used in a similar way with or without the handle.

The preferred tool is that of Fig. 4 when the instrument of Fig. 1 is to be used at a public gasoline filling station. This tool is especially adapted for such use. The attendant asks the privilege of testing a customer's engine oil. He inserts tube 25 especially made long enough for the purpose) into the oil of the crank case and to go to the very bottom of the crank case. He draws back handle 24 and sucks a test sample of the oil up the tube through the windows to form the film and toward the pump, leaving film space between the windows 19 full of oil. He then disconnects the tube 25 and pump 23 from bosses 18 of the intermediate section. And he places those bosses in the saddles of the tool holders 26 (Fig. 1) with the window frame centralized by boss 16. A hood, not shown, may then be placed to shut out the daylight. Then the electric light 30 is turned on and a reading taken from indicator 35 in full view of the customer. A fact proved by practice is that many oil tests are made at a public filling station in which the oil is shown to be in fine condition and no refilling necessary. After a customer gets acquainted with this fact he will depend more and more on the real scientific nature of the instrument to tell him exactly when to change his oil and thus be saved from the waste of the customary hit or miss method of changing oil now in vogue.

We are aware of the prior art patents to Schoenberg 1,940,772 and 1,940,373, disclosing testing instruments and tools for the same general oil testing plan as ours. Our own invention is in the improved tools for handling the test sample from start to finish with a view to greater facility in the testing work. It is a scientific test that one wants to carry out under the inspection and with the acceptance of a large public. There are problems in commercializing the plan which makes speed, convenience, accuracy, and cleanliness particularly important factors in the manipulation, not only for the public, but for the filling station attendant.

With the tool of Fig. 4 the sample is drawn, formed into a film, placed on the electric tester, and a reading given to the customer with real speed and no confusion of "sloppy" manipulation. After the test and with a satisfied customer gone on his way, the window frame can be separated for cleaning, as in Figs. 2 and 3, or as described in connection with Fig. 3a (to simplify the drawing, this feature is not shown in Fig. 4), and quickly closed. But after the greater number of tests the tool of Fig. 4 can be cleaned by merely drawing from a supply of cleaning fluid and passing the latter through the film space between the windows by manipulation of the pump 23.

The tool of Fig. 4 is an improvement in oil testing tools, even without its use with the electric oil tester of Fig. 1. The human eye is sufficient in some cases to see that the film of oil from an engine crank case, between the glass windows, is sufficiently free of dirt for a customer to avoid refilling with engine oil or to bother with the electric test in his particular case. Thus, that tool while especially suited for the full scientific test is a means for quickly saying so when the oil is free of dirt and no scientific test is worth while.

Having disclosed our invention, what we claim is:

1. A tool of the kind described comprising a double window frame section having windows held apart a film distance, bosses on opposite sides of said frame section, a tube for insertion into the oil of an engine crank case, a hand pump, bayonet slot connections between said tube and one of the bosses and between the hand pump and the other of said bosses, whereby the parts may be quickly connected in line so that the pump can draw an oil sample from an engine through the tube into said film space, and the parts can be quickly disconnected so that the frame section can be separately used with a testing instrument.

2. A tool of the kind described comprising a double window frame section having windows held apart a film distance, a flexible tube for insertion through the oil indicator opening of an engine crank case substantially to the bottom of said crank case and attached by a hand coupling to one side of the frame section, and a hand pump attached by a hand coupling to the opposite side of the frame section from the tube, the assembly being readily transportable to the crank case of an engine to draw a sample of engine oil therefrom through the tube and between the windows of the frame section, said hand couplings permitting quick disconnection of the frame section from the tube and pump for insertion in a testing instrument.

3. A tool of the kind described comprising a double window frame section having windows held apart a film distance, bosses on opposite sides of the frame section, a flexible tube for insertion through the oil indicator opening of an engine crank case substantially to the bottom of said crank case, a hand pump, bayonet slot connections between said tube and one of the bosses and between the hand pump and the other of said bosses, whereby the parts may be quickly connected in line so that the pump can draw an oil sample from the engine crank case into said film space through the tube, and the parts can be quickly disconnected so that the frame section can be separately used with a testing instrument.

4. A tool of the kind described comprising a double window frame section having windows held apart a film distance, bosses on opposite sides of the frame section adapted to support the frame section when the latter is placed in a testing machine, a flexible tube for insertion through the oil indicator opening of an engine crank case substantially to the bottom of said crank case, a hand pump, bayonet slot connections between said tube and one of the bosses and between the hand pump and the other of said bosses whereby the parts may be quickly connected in line so that the pump can draw an oil sample from the engine crank case into said film space through the tube, and the parts can be quickly disconnected so that the frame section can be separately used with a testing instrument, and means on the frame section for securing accurate alignment of said frame section with the aperture of a testing instrument.

JOSEPH A. LOGAN.
LEOLYN F. SPEAR.